United States Patent [19]

Tsuchiya

[11] Patent Number: 4,745,430

[45] Date of Patent: May 17, 1988

[54] MALFUNCTION DETECTING DEVICE IN USE FOR THE FIXING DEVICE OF AN IMAGE-FORMING APPARATUS

[75] Inventor: Shizuo Tsuchiya, Tokyo, Japan

[73] Assignees: Casio Computer Co. Ltd.; Casio Electronics Manufacturing Co., Ltd., both of Tokyo, Japan

[21] Appl. No.: 923,029

[22] Filed: Oct. 24, 1986

[30] Foreign Application Priority Data

Nov. 1, 1985 [JP] Japan .................. 60-245635
Jan. 22, 1986 [JP] Japan .................. 61-11330

[51] Int. Cl.$^4$ .................. H05B 1/02; G03G 15/00
[52] U.S. Cl. .................. 355/3 FU; 335/14 FU; 219/216; 219/469; 219/471
[58] Field of Search .................. 219/216, 469–471, 219/499, 501, 505; 355/3 FU, 14 FU

[56] References Cited

U.S. PATENT DOCUMENTS

| | | | |
|---|---|---|---|
| 4,324,486 | 4/1982 | Nishikawa | 219/216 X |
| 4,369,354 | 1/1983 | Goedecke et al. | 219/216 X |
| 4,374,321 | 2/1983 | Cunningham, Jr. et al. | 219/216 X |
| 4,493,984 | 1/1985 | Yamauchi | 219/216 X |
| 4,556,779 | 12/1985 | Hashimoto et al. | 219/216 |

FOREIGN PATENT DOCUMENTS 3347767 8/1984 Fed. Rep. of Germany .
58-55505 7/1980 Japan .

Primary Examiner—Patrick R. Salce
Assistant Examiner—Emanuel Todd Voeltz
Attorney, Agent, or Firm—Nixon & Vanderhye

[57] ABSTRACT

A temperature control device uses a thermo-sensitive element to detect the temperature of an imaging system heated fixer device member. A comparator compares the potential generated by the thermo-sensitive element corresponding to the detected temperature with a reference voltage to set the temperature of the heated member to a predetermined level. A signal representing the comparison result is used for controlling the temperature of the heated member. Any abnormality of the heated member is detected on the basis of the output signal from an oscillator producing a signal which changes the reference potential at predetermined periods and from the comparator output signal.

11 Claims, 6 Drawing Sheets

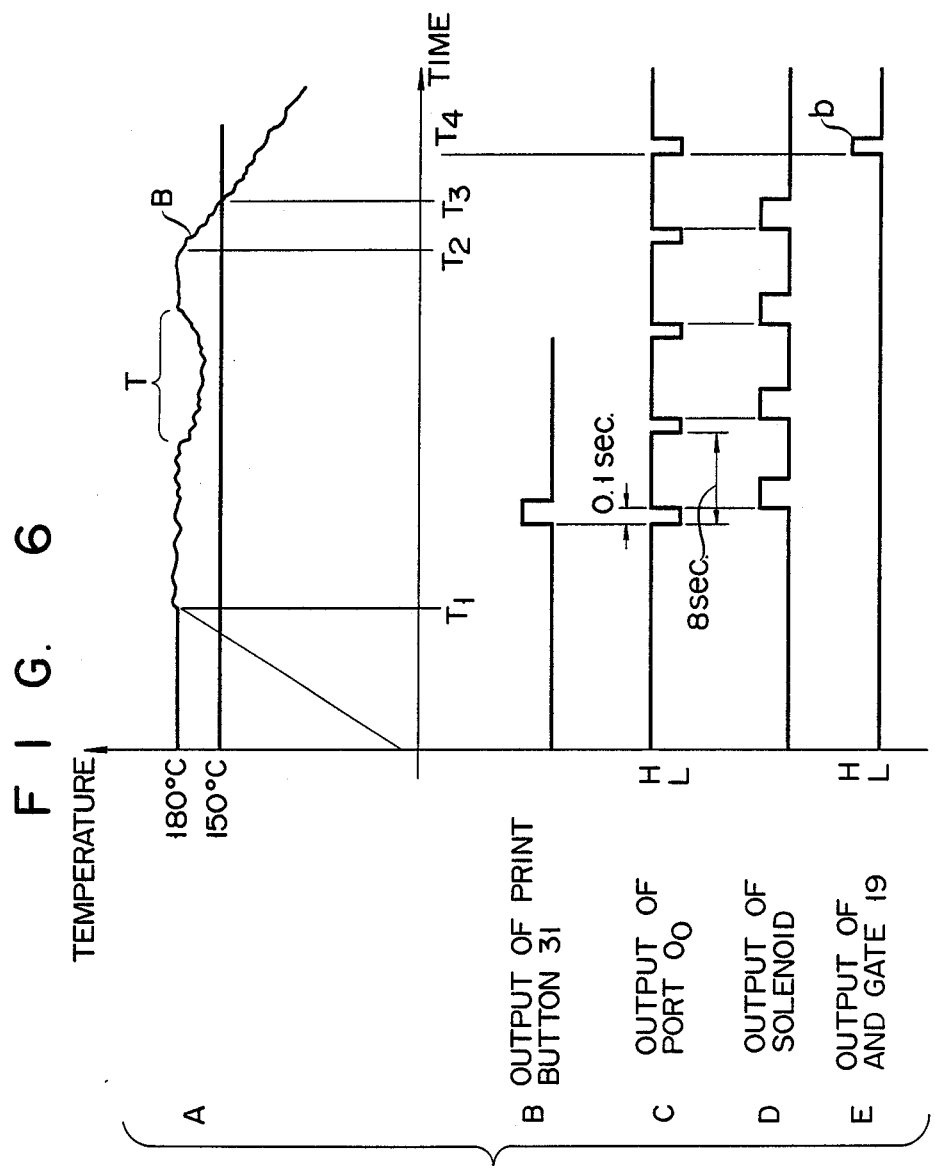

MALFUNCTION DETECTING DEVICE IN USE FOR THE FIXING DEVICE OF AN IMAGE-FORMING APPARATUS

BACKGROUND OF THE INVENTION

This invention relates to a temperature control device in use for the fixing device of an image-forming apparatus, which can detect a disconnection occurring in a high-voltage circuit of the commercial power supply, in a low-voltage temperature control circuit.

To perform temperature control for the fixing device of an image-forming apparatus such as an electronic photocopying machine, it is necessary for the fixing temperature to be kept constant. Accordingly, various temperature control circuits have been developed for this purpose. In one such example of a temperature control circuit, the temperature of the peripheral surface of a heating roller is detected by means of a thermo-sensitive element such as a thermistor. Based on the result, power to the heating element, such as a heater, is turned on and off to maintain the optimum temperature level for fixing. FIG. 1 shows a typical conventional temperature control circuit for a fixing device. This control circuit is composed of a high-voltage circuit having a commercial power supply circuit with a heating element, and a low-voltage control circuit having a thermo-sensitive element. In this temperature control circuit, the circuit for detecting the disconnection of the heating element is usually contained in the high-voltage circuit.

The circuit illustrated in FIG. 1 is constructed having a bridge circuit which is composed of thermistor TH, resistors $R_1$, $R_2$, and $R_3$, a temperature control section made up of comparator $Q_1$, trigger circuit 1, transistor $Q_2$, and resistors $R_4$ to $R_6$, and a heater-disconnection detecting section having a triac 2, a heater H, alternating-current power supply 3, and current-detecting circuit 4.

In this circuit, comparator $Q_1$ compares the voltage $V_N$ obtained, by dividing the power voltage Vcc by resistor $R_3$ and thermistor $T_H$, and the reference voltage $V_I$ obtained, by dividing it by resistors $R_1$ and $R_2$. The compared voltage turns triac 2 on and off via transistor $Q_2$ and trigger circuit 1. In this way, the temperature control circuit controls the feed of AC current to the heater. During this operation, current-detecting circuit 4 monitors the output of comparator $Q_1$. When the output of comparator $Q_1$ is a high signal (which is output if the current, which should be supplied by the closed-loop circuit, is not supplied from AC power supply 3), current-detecting circuit 4 outputs a disconnection signal A, to indicate disconnection of the heater. The conventional temperature control device, as described above, is capable of detecting the disconnection of heater H. However, current-detecting circuit 4 must be designed so as to withstand high voltage, since it is coupled with AC power supply 3, or a commercial power supply. Such a circuit is inevitably costly to manufacture. Furthermore, the conventional temperature control circuit has to be designed so as to satisfy the power supply specifications of each country of export. This means that standardization of parts cannot be attained, so that the inefficient production of small quantities of many different types of parts is therefore unavoidable.

SUMMARY OF THE INVENTION

An object of this invention is to provide a temperature control device for use in an image-forming apparatus, which is free from the above defects and can be constructed having only a simple low-voltage circuit using AND gates, and to realize a reduction in the manufacturing cost thereof.

Another object of this invention is to provide a temperature control device for the fixing device of an image-forming apparatus, in which standardization of parts can be achieved, not withstanding the diverse power supply specifications of various countries.

To achieve the above objects, there is provided a temperature control device in use for the fixing device of an image-forming apparatus, comprising a heated member heated by a heat source included in a closed-loop circuit of a commercial power supply, detection means for detecting the temperature of the heated member, which means is connected to one of the arms of a bridge circuit coupled to receive a low-power voltage, means for controlling the current-feed to the heated member, on the basis of the result of comparison of the output signal from the detecting means and a reference potential signal appearing at the output terminal of the bridge circuit, for setting the temperature of the heated member to a predetermined level, means for changing the reference potential according to the output signal from the current-feed means, and means for producing a signal indicative of a heat source abnormality, in response to the output signals of the current-feed control means and the reference potential-changing means.

With such an arrangement, the disconnection-detecting circuit for the heated member can be constructed having a low-voltage circuit of simple construction, using AND gates, for example. Therefore, there is no need for a circuit able to withstand a high voltage. Furthermore, standardization of parts can be achieved, not withstanding the different power supply specifications of various countries of export.

BRIEF DESCRIPTION OF THE DRAWINGS

FIG. 6 is a time chart useful in explaining the operation of the circuit shown in FIG. 5, and the temperature characteristics associated with the time chart.

DETAILED DESCRIPTION OF THE PREFERRED EMBODIMENT

An embodiment of the temperature control device in use for the fixing device of an image-forming apparatus according to this invention will now be described, with reference to the accompanying drawings.

Figure 1:
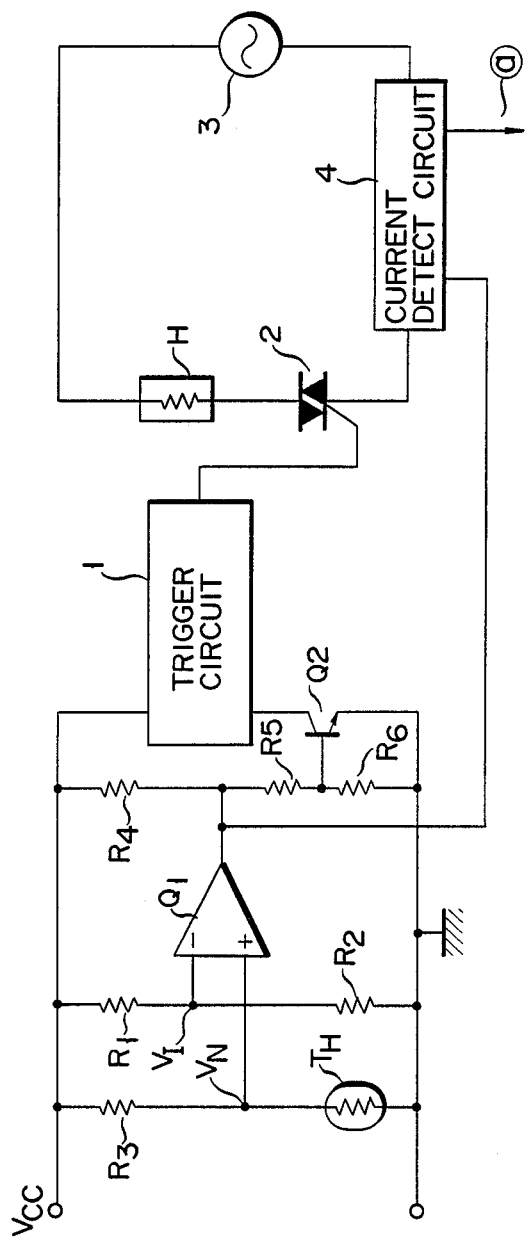
FIG. 1 is a circuit diagram of the conventional temperature control device for use in the fixing device of an image-forming apparatus.
Figure 2:
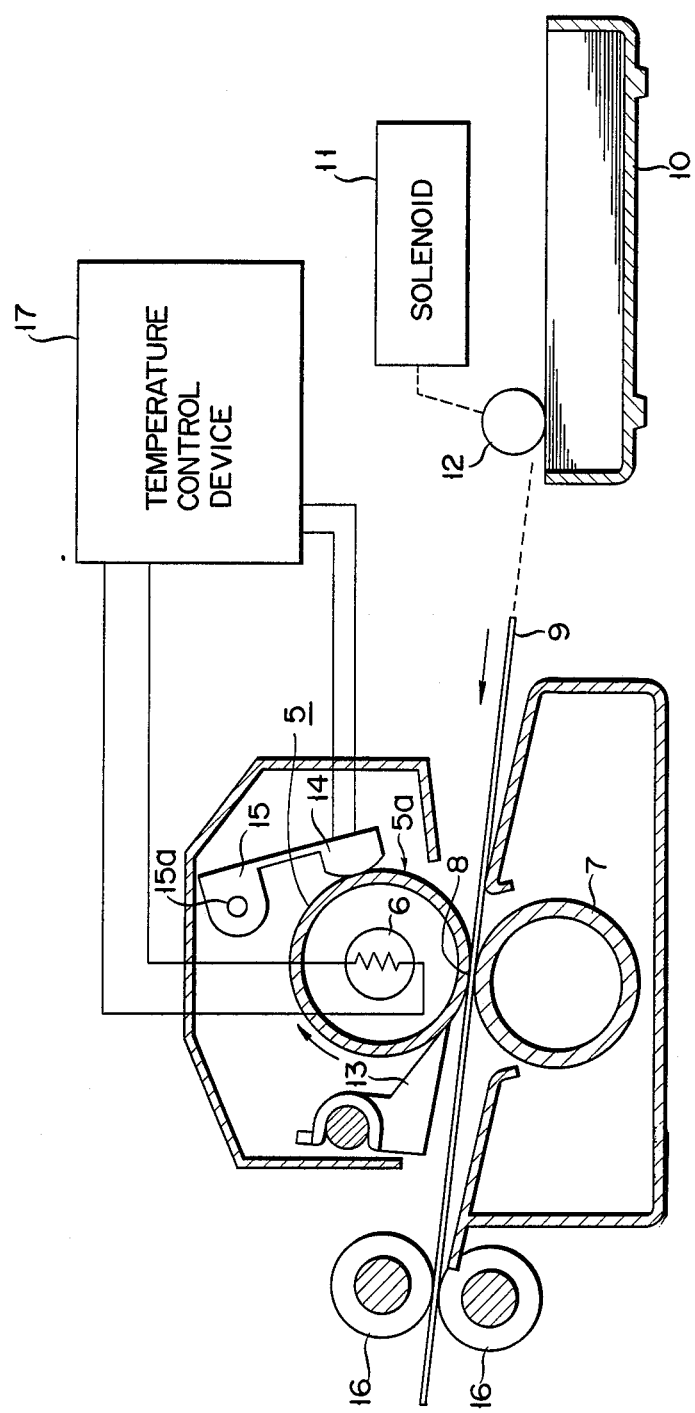
FIG. 2 shows a longitudinal sectional view schematically illustrating a part of the fixing device of an image-forming apparatus, which is connected to the temperature control device according to this invention.

As is shown in FIG. 2, heating roller 5 contains heat source 6; for example, a heater. The peripheral surface of roller 5 is coated with resin 5a which has good heat resistance and can be easily parted for toner; for example, Teflon. Heating roller 5 rotates in the direction indicated by an arrow. The peripheral surface of pressure roller 7 is coated with a material, such as silicon rubber, having high heat-resistance and resilience. The peripheral surface of roller 7 is in pressing contact with heating roller 5. Paper 9, on which a toner image is to be formed, is nipped and is passed, in the direction of the arrow, through nipping portion 8, which is formed when both rollers are in pressing contact with each other. Paper 9 is stored in cassette 10. Paper 9 is transferred to nipping portion 8, in cooperation with paper-transfer solenoid 11 and paper-transfer roller 12. When paper 9 passes between rollers 5 and 7, pressing tightly against each other, heat supplied by heat source 6 and pressure exerted by pressure roller 7 combine to fix a toner image on paper 9. Pawl 13 is provided downstream of heating roller 5. Paper 9 emanating from nipping portion 8 is peeled off heating roller 5, by the tip of pawl 13 and is transferred to exit roller 16, by means of which, paper 9 is ejected from the apparatus. Thermistor 14 is provided in contact with the peripheral surface of heating roller 5, for detecting temperature. Thermistor 14 is mounted on arm 15, which is rotatable about axis 15a. Connected to heat source 6 and thermistor 14, is temperature control section 17.

Figure 3:
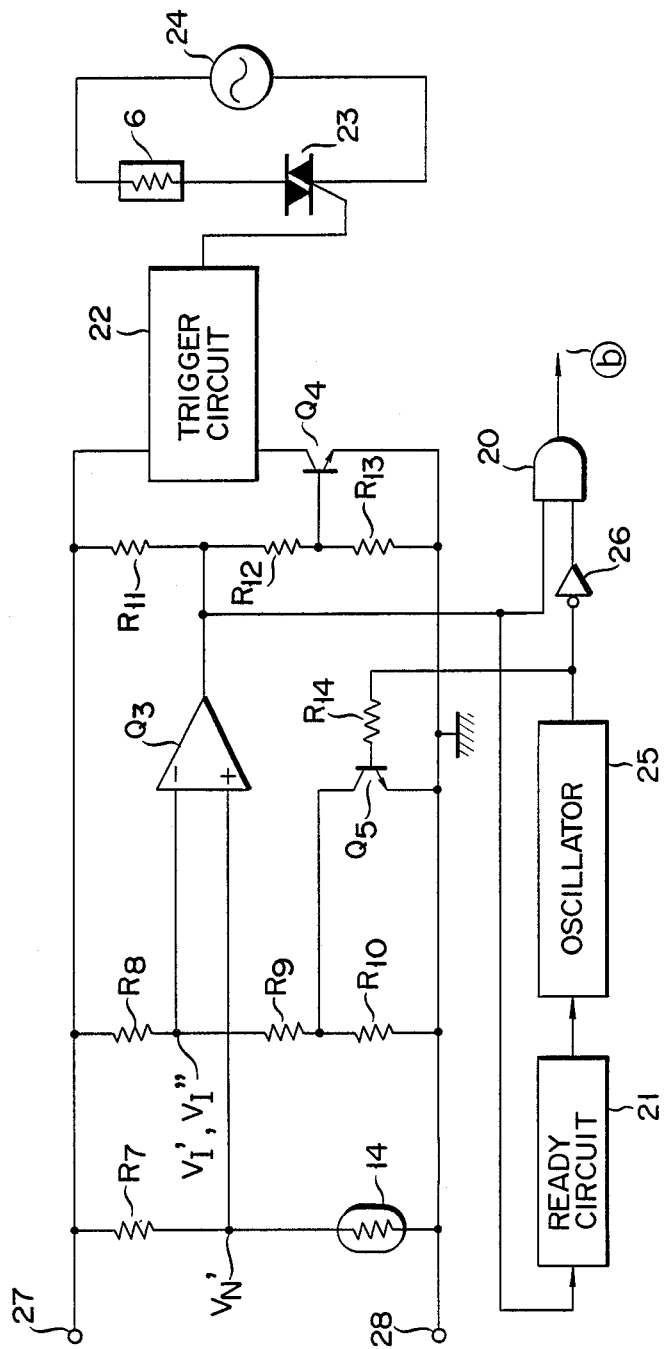
FIG. 3 is a circuit diagram of an embodiment of the temperature control device according to this invention.

The temperature control device with a physical arrangement as described above, contains a temperature control circuit illustrated in FIG. 3.

In this figure, a series circuit of resistor $R_7$ and thermistor 14 as a temperature sensitive element, is connected in parallel with a series circuit of resistors $R_8$, $R_9$, and $R_{10}$, to form a bridge circuit. The node between thermistor 14 and resistor $R_7$ is coupled with the non-inverting input of comparator $Q_3$. The node between resistors $R_8$ and $R_9$ is coupled with the inverting input of comparator $Q_3$. The output of comparator $Q_3$ is coupled with the node between resistors $R_{11}$ and $R_{12}$. The output of comparator $Q_3$ is also coupled with the input of AND gate 20 and ready circuit 21. Also connected to resistor $R_{12}$ is resistor $R_{13}$. Three resistors $R_{11}$, $R_{12}$, and $R_{13}$ form a series circuit. The base terminal of transistor $Q_4$ is connected to the node between resistors $R_{12}$ and $R_{13}$. The emitter of transistor $Q_4$ is connected to ground, and the collector is connected to trigger circuit 15.

The trigger output of trigger circuit 22 is connected to the gate terminal of triac 23. Triac 23, heater 6, and AC power supply 24 cooperatively form a close circuit. The output of ready circuit 21 is coupled with the input of oscillator 25, whose output is coupled with the input of the AND gate 20 via inverter 26. AND gate 20 outputs a signal b representative of the disconnection of heater 6, when the conditions to be given later are satisfied. The output of oscillator 25 is also coupled with the base of transistor $Q_5$ via resistor $R_{14}$. The collector of transistor $Q_5$ is connected to the node between resistor $R_9$ and $R_{10}$ which form the bridge circuit. The emitter of the transistor is connected to ground.

The operation of the temperature control circuit thus arranged will now be described.

A switch (not shown) is turned on and power is supplied to terminals 27 and 28, to cause this circuit to operate. At the time of power-on, the surface temperature of heating roller 5 is at room temperature. Because of this, the resistance of thermistor 14 is high, and therefore, voltage $V_N$, at the node between resistor $R_7$ and thermistor 14, is higher than voltage $V_f$ at the node between resistor $R_8$ and $R_9$. As a result, the output of comparator $Q_3$ goes high, to turn on transistor $Q_4$ and trigger circuit 22, and the high signal is supplied to the gate of triac 23. Through the above sequence of operations, triac 23 is conductive, and AC current flows into the closed loop consisting of AC power source 24, heater 6, and triac 23. With the AC current flow, heating roller 5 is heated by heater 6, and the temperature of the peripheral surface of heating roller 5 gradually rises.

By way of this heating, heating roller 5 is gradually heated, and thermistor 14 detects the toner-fixable temperature (approximately 180° C.). Voltage $V_f$ which corresponds to the temperature of 180° C., determined by the ratio of resistance of $R_8$ to that of $R_9$, is applied to the inverting input terminal of comparator $Q_3$. At this time, as will be described later, transistor $Q_5$ is turned on, and the potential at one end of resistor $R_9$ is almost equal to ground potential. Input voltage $V_N$ is then lower than $V_f$, so that the output of comparator $Q_3$ goes low. Therefore, transistor $Q_4$ is turned off, trigger circuit 22 is also turned off, and the AC current flowing through the closed loop of triac 23 is stopped.

Figure 4:
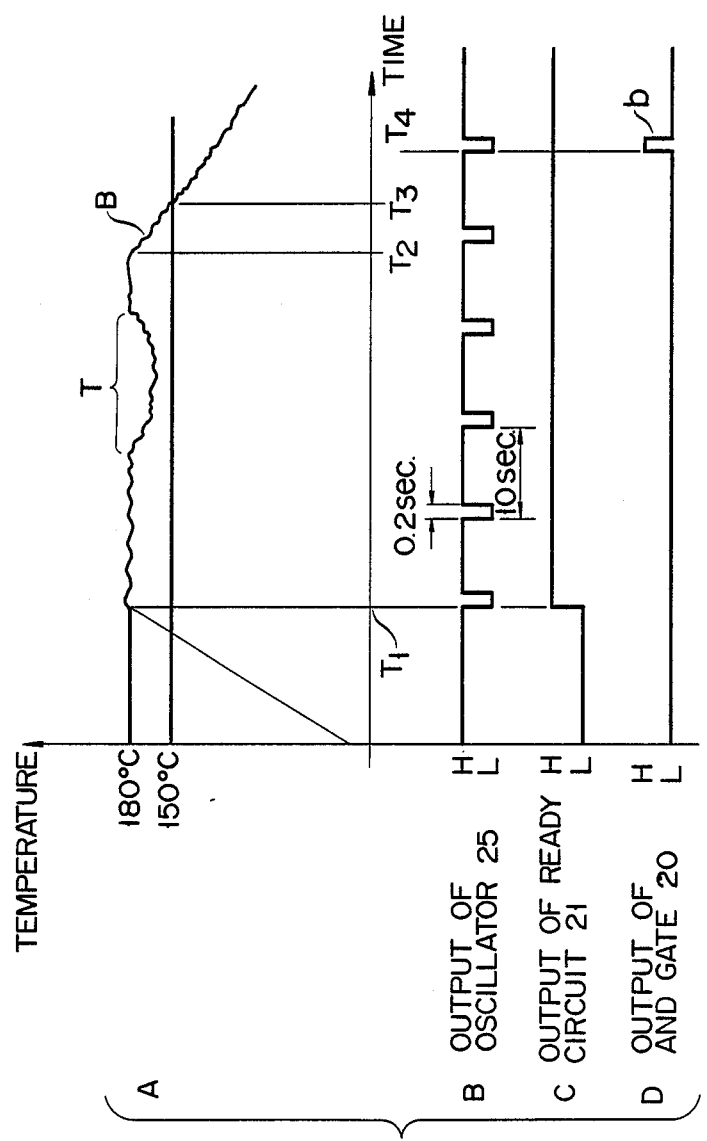
FIG. 4 is a time chart useful in explaining the operation of the circuit shown in FIG. 3, and the temperature characteristics associated with the time chart.

As the result of the circuit operation, heater 6 stops heating. When heater 6 stops heating, and the detected temperature of thermistor 14 becomes lower, the output of comparator $Q_3$ is again inverted. By repeating the above operations, temperature control is executed, so that a predetermined temperature (180° C.) is reached. When the output signal changes from high to low level, ready circuit 21 outputs a high signal in place of the low signal thus far used. In response to the high signal input, oscillator 25 outputs, to AND gate 20, a pulse signal with a 0.2 sec. width every 10 sec., for example. See FIG. 4 illustrating the time chart and temperature characteristics. Therefore, transistor $Q_5$ is turned off when the output of oscillator 25 is a low signal, as is illustrated in FIG. 4B, and a series circuit consisting of resistors $R_9$ and $R_{10}$ is formed. Accordingly, reference voltage $V_{f'}$ is applied to the inverting input terminal of comparator $Q_3$, in place of reference voltage $V_f$ thus far applied. Reference voltage $V_{f'}$ is set to a value which is defined by the resistance of thermistor 14 when it inverts the logical state of comparator $Q_3$. For this reason, when the output of oscillator 25 is a low signal, comparator $Q_3$ outputs a high signal only when the temperature of heating roller 5 is less than 150° C. As long as the power supply is not turned off, the only possible cause for the temperature of the heating roller falling below 150° C. is the disconnection of heater 6. Even when the paper passes through the fixing device, as can be seen from time duration T in FIG. 4A, the temperature of the heating roller will not fall below 150° C. This 150° C. is the lowest temperature at which the fixing device can thermally fix the toner. Generally, a temperature of around 180° C. is desirable for thermal fixing of the toner, but as long as the temperature is above 150° C., fixing problems will not occur.

The high or low signal of comparator $Q_3$, together with the pulse signals (0.2 sec/10 sec.) from oscillator 25, is input to AND gate 20 via inverter 26, as is described above. Then, AND gate 20 generates an output in response to the high signal from inverter 26, and indicates by this output that there was an output from comparator $Q_3$. At this time, if the output of comparator $Q_3$ is a low signal, viz., if it is in the operation state of the temperature control circuit at time point $T_1$ in the time/temperature characteristics chart of FIG. 4, signal b will not be output from AND gate 20. However, when heater 6 is disconnected at time $T_2$, after time $T_2$, $T_3$, and $T_4$ have elapsed, the temperature of the heating roller 5 will fall, as is shown by curve B in FIG. 4. At $T_4$, the low input from oscillator 25 is received by AND gate 20 via inverter 26. AND gate 20 detects the high output of $Q_3$, and outputs signal b indicating disconnection of the heater. This signal b is supplied to a control device (not shown in the drawing), such as a microcomputer. The control device receives this signal, to execute such processing as copying prohibition, and abnormality display.

As is described above, in the temperature control device of this embodiment, two different reference voltage values, which correspond to the toner-fixable temperature and the ordinary fixing temperature, respectively, are set, and applied to comparator $Q_3$. A voltage corresponding to the toner-fixable temperature (for example, 150° C.) is applied to comparator $Q_3$ for a predetermined time interval (for example, 10 sec.). On the other hand, thermistor 14 applies a voltage, based on the detected temperature, to comparator $Q_3$. Comparator $Q_3$ then compares these two temperatures. If it is determined by this comparison that the temperature of heating roller 5 is below the predetermined level, and if a high signal is output by comparator $Q_3$, AND gate 20 outputs signal b, to indicate that the disconnection condition of heater 6 has been detected.

While, in the above-mentioned embodiment, this invention is applied to the fixing device of an image-forming apparatus, this invention, of course, is applicable to any type of electrical apparatus with a temperature control device for controlling the heater temperature in a feedback manner; for example, an electric heater.

In this embodiment, the voltage values corresponding to the temperatures of the heating roller 5, 150° C. and 180° C. detected by thermistor 14, are used for the reference voltages. However, the reference voltages may be set to other appropriate values, if necessary.

Another embodiment of this invention will now be described, with reference to FIGS. 5 and 6. In this embodiment, the fixing device has substantially the same physical arrangement as that of FIG. 2.

Figure 5:
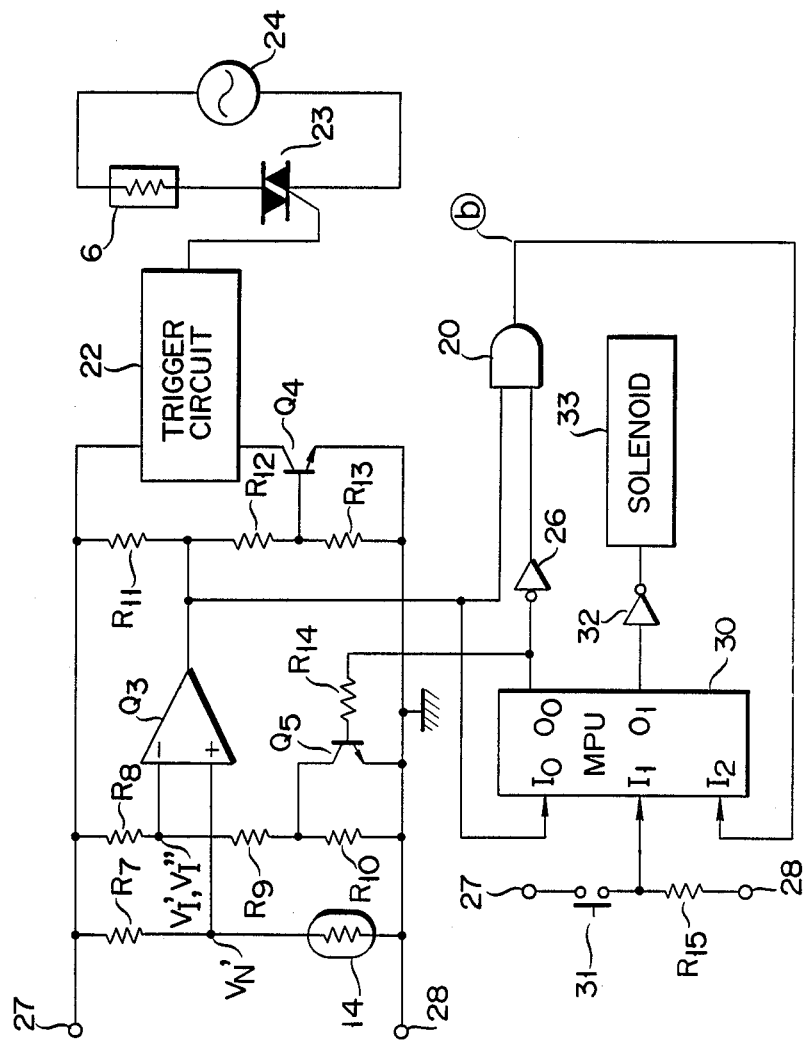
FIG. 5 is a circuit diagram of another embodiment of the temperature control device according to this invention.

In FIG. 5, a series circuit including thermistor 14 as a thermo-sensitive element, and resistor $R_7$, is connected in parallel with a series circuit consisting of resistors $R_8$, $R_9$, and $R_{10}$, to form a bridge section. The connection point of the thermistor 14 and resistor $R_7$ is connected to the non-inverting input of comparator $Q_3$, and the junction of resistors $R_8$ and $R_9$ is connected to the inverting input of comparator $Q_3$. The output of comparator $Q_3$ is connected to the junction of $R_{11}$ and $R_{12}$. The output of comparator $Q_3$ is also connected to the input of AND gate 20, and to input port $I_0$ of microprocessor (MPU) 30. Resistor $R_{13}$ is also connected to $R_{12}$. Resistors $R_{11}$, $R_{12}$, and $R_{13}$ form a series circuit.

The base terminal of transistor $Q_4$ is connected to the junction of resistors $R_{12}$ and $R_{13}$. The emitter terminal of $Q_4$ is grounded, and the collector terminal is connected to trigger circuit 22.

The trigger output of trigger circuit 22 is connected to the gate terminal of triac 23. Triac 23, heater 6, and AC power supply 24 form a closed-loop circuit.

Print button 31 is depressed to input a current to input port $I_1$ of MPU 30. Output port $O_0$ of MPU 30 is connected to the input of AND gate 20, via inverter 26.

When the conditions to be explained later are all met, AND gate 20 outputs a signal b for indicating the disconnection of the heater 6. Output port $O_0$ is also connected to the base terminal of tran-sistor $Q_5$. The collector terminal of $Q_5$ is connected to the junction of resistor $R_9$ and $R_{10}$ of the bridge circuit, and the emitter terminal is grounded.

MPU 30 is also provided with output port $O_1$. The output of $O_1$, as a driver, is connected to solenoid 32. This solenoid, as is shown in FIG. 2, turns the paper feed roll, to transfer paper from the cassette. MPU 30 performs the control of the entire copying machine. MPU 30 also has other terminals, but their explanation is not necessary for the description of this invention.

The operation of the fixing device with the circuit arrangement as described above, will be given.

First, a switch (not shown) is turned on to supply power between terminals 27 and 28, and this circuit starts to function. When the switch is turned on, the surface of heating roller 5 is at room temperature. The resistance of thermistor 14 is high, and voltage $V_N$ at the junction of $R_7$ and $R_9$ is higher than voltage $V_f$ at the junction between resistors $R_8$ and $R_9$. Because of this, the output of comparator $Q_3$ goes high, transistor $Q_4$ is turned on, trigger circuit 22 is turned on, and a high signal is supplied to the gate of triac 23. Through this sequence of operations, triac 23 becomes conductive and AC current flows in the closed-loop circuit composed of AC power supply 24, heater 6, and triac 23. Heating roller 5 is heated by heater 6, and its surface temperature gradually rises.

By way of this heating, heating roller 5 is gradually heated, and thermistor 14 detects the toner-fixable temperature (approximately 180° C.). Voltage $V_f$ which corresponds to the temperature of 180° C., determined by the ratio of resistance of $R_8$ to that of $R_9$, is applied to the inverting input terminal of comparator $Q_3$. At this time, as will be described later, transistor $Q_5$ is turned on, and the potential at one end of resistor $R_9$ is almost equal to ground potential. Input voltage $V_f$ is then higher than $V_N$, so that the output of comparator $Q_3$ goes low. Therefore, transistor $Q_4$ is turned off, trigger circuit 22 is also turned off, and the AC current flowing through the closed loop of triac 23 is stopped.

As the result of the above circuit operation, heater 6 stops heating. When heater 6 stops heating and the detected temperature of thermistor 14 becomes lower, the output of comparator $Q_3$ is again inverted. By repeating the above operations, temperature control is executed, so that a predetermined temperature (180° C.) is reached.

The circuit operation of FIG. 5 will now be described, with reference to FIG. 6, i.e., the time/temperature characteristics chart. When the input voltage to input port $I_0$ of MPU 30 is changed to low level, MPU 30 decides, at time $T_1$, that the fixing device is in the "ready" state. After $T_1$ has elapsed, as is shown in FIG. 6B, if print button 31 is depressed, output port $O_0$ goes low for about 0.1 sec. (FIG. 6C). For this reason, transistor $Q_5$ is turned off, and resistors $R_9$ and $R_{10}$ form a series circuit. Reference voltage $V_f$ at the inverting input terminal of comparator $Q_3$, is replaced by reference voltage $V_{f'}$. Reference voltage $V_{f'}$ is set to a value that is defined by the resistance of thermistor 14 when it inverts the logical state of comparator $Q_3$. As a result, when the output of output port $O_0$ is a low signal, comparator $Q_3$ outputs a high signal only when the temperature of heating roller 5 is below 150° C. As long as the power supply is not turned off, the only possible cause for the temperature of the heating roller falling below 150° C. is the disconnection of heater 6. Even when the paper passes through the fixing device, as can be seen from the interval T in FIG. 6, the temperature of the heating roller will not fall below 150° C. The temperature 150° C. is the lowest temperature at which the fixing device can thermally fix the toner. Generally, a temperature of around 180° C. is desirable for thermal fixing of the toner, but as long as the temperature is above 150° C., fixing problems will not occur.

The high or low signal of comparator $Q_3$, together with the pulse signals from output port $O_0$ is input to AND gate 20, via inverter 26. Then, AND gate 20 generates an output in response to the high signal from inverter 26, and indicates by this output that there was an output from comparator $Q_3$. At this time, if the output of comparator $Q_3$ is a low signal, viz., if it is in the operation state of the temperature control circuit during the period from $T_1$ to $T_3$ of the time/temperature characteristics chart of FIG. 6, interrupt signal b will not be output from AND gate 20. At the point in time when the output of output port $O_0$ rises to high level, if signal b is not output as shown in FIG. 6E, solenoid 33 is energized, as is shown in FIG. 6D, the paper-feeding rollers rotate, as is shown in FIG. 2, and the copying operation begins. Each time one copying cycle is completed, the output of output port $O_0$ changes to low level for about 0.1 sec., and a check is performed as to whether heater 6 has been disconnected. This copying cycle is about 8 sec. long, therefore, one check is performed every 8 sec. If no trouble is detected by the check, the copying of the set number of copies continues to its completion, whereupon the copying cycle ends. However, as is shown by temperature characteristics curve B, if heater 6 is disconnected at time $T_2$, as times $T_2$, $T_3$, and $T_4$ are elapsing, the temperature of heating roller 5 falls. At time $T_4$, when a high signal is output from comparator $Q_3$, AND gate 20 receives this signal, and outputs signal b. Signal b is input to input port $I_2$ of MPU 30, which then executes processing such as copying prohibition, and abnormality display.

As is described above, in the temperature control device of this embodiment, two different reference voltage values, which correspond to the toner-fixable temperature and the normal fixing temperature, respectively, are set and applied to comparator $Q_3$. A voltage corresponding to the toner-fixable temperature (for example, 180° C.) is applied to comparator $Q_3$, at predetermined timings. On the other hand, thermistor 14 applies a voltage, based on the detected temperature, to comparator $Q_3$. Comparator $Q_3$ then compares these two temperatures. If it is determined by this comparison that the temperature of heating roller 5 is below the predetermined level, and if a high signal is output by comparator $Q_3$, AND gate 20 outputs signal b, to indicate that the disconnection condition of heater 6 has been detected.

In the above-mentioned embodiment, two temperatures, 180° C. and 150° C., are selected as the temperatures for heating roller 5 (the temperature sensed by thermistor 14), which temperatures provide the reference voltages to be compared by comparator $Q_3$. It should be understood that the choice temperature is not limited to these figures.

In the embodiments described above, the temperature is measured before paper 9 is fed to heat roller 5 and pressure roller 7. For example, in the embodiments of FIG. 5, the temperature is detected before solenoid 33 is turned on. Instead, the temperature can be detected once during each copying cycle, for example when the optical system starts scanning, or when a paper-discharging switch is turned on.

Furthermore, this invention can be applied to temperature control devices other than fixing devices, such as tube-wall temperature control devices for fluorescent lights. Also, it can be applied to image-reproducing devices other than copying machines, such as fixing devices for the page printers which use LEDs, lasers, or liquid crystal as printing heads.

What is claimed is:

1. A temperature control device for use in the fixing device of an image-forming apparatus, comprising:
   a heated member heated by a heat source included in a closed-loop circuit of a commercial power supply;
   detecting means for detecting the temperature of said heated member, which is connected to one of the arms of a bridge circuit coupled for reception, using a low-power voltage;
   means for controlling the current-feed to said heated member, on the basis of the result of comparison of the output signal from said detecting means and a reference potential appearing at the output terminal of said bridge circuit, which is for setting the temperature of said heated member to a predetermined level;
   means for changing said reference potential according to the output signal from said controlling means; and
   means for producing a signal indicative of a heat source abnormality, in response to the output signals of said current-feed control means and said reference potential-changing means.

2. The temperature control device according to claim 1, wherein said reference potential-changing means includes means for changing the reference potential at the output terminal of said bridge circuit, at predetermined periods.

3. The temperature control device according to claim 2, wherein said means for changing said reference potential at predetermined periods includes an oscillator which receives an output signal from said current-feed control means and changes said reference potential on the basis of the output signal produced at predetermined periods.

4. The temperature control device according to claim 2, wherein said means for changing said reference potential at predetermined periods includes a microprocessor unit which receives the output signal from said current-feed control means and changes said reference potential by the output signal produced at the predetermined periods.

5. The temperature control device according to claim 4, wherein the output signal produced for said microprocessor to change said reference potential is generated in synchronism with the paper-feed operation.

6. The temperature control device according to claim 1, wherein said reference potential-changing means changes said reference potential after said current-feed control means receives a signal derived from said detecting means and indicating that a predetermined temperature has been reached, and produces a signal for current-feed control.

7. The temperature control device according to claim 1, wherein said reference potential-changing means changes said reference potential, so that the reference potential, after being changed, is higher than that before it was changed.

8. In a photocopier fixer electrical heater arrangement of the type including:
- a heater element,
- switching means for selectively activating said heater element in response to a control signal,
- temperature detecting means for measuring the temperature of said heater element and for producing a measured level $V_N$ responsive to the heater element temperature, and
- comparing means, connected to receive said measured level $V_N$ and also connected to receive a reference level $V_I$ corresponding to a preset temperature, for producing said control signal in response to the relative levels of said reference and measured levels, said control signal controlling said switching means to activate said heater element whenever said heater element temperature falls below said preset temperature,
- an improvement comprising a fault detecting circuit connected to said comparing means for indicating a fault in said heater arrangement, said circuit including:
- reference level producing means for applying said reference level $V_I$ to said comparing means and for periodically alternating said reference level $V_I$ between a first value corresponding to a preset desired operating temperature, and a second value corresponding to a minimum temperature lower than said desired operating temperature; and
- fault indicating means, connected to receive said control signal and also connected to said reference level producing means, for detecting a fault in response to said control signal when the temperature of said heater element measured by said detecting means falls below said minimum temperature and for producing an indication of said detected fault.

9. An arrangement as in claim 8 wherein said reference level producing means periodically alternates said reference level between said first and second values only when said control signal controls said switching means to deactivate said heater element.

10. A photocopier fixer element electrical heater arrangement comprising:
- a heater element;
- switching means for selectively activating said heater element in response to a control signal;
- temperature detecting means for producing a measured level responsive to the temperature of said heater element;
- comparing means, connected to receive said measured level and also connected to receive a reference level corresponding to a preset temperature, for producing said control signal in response to the relative levels of said reference and measured levels, said control signal controlling said switching means to activate said heater element whenever said heater element temperature falls below said preset temperature;
- reference level producing means for applying said reference level to said comparing means and for periodically alternating said reference level between a first value corresponding to a predetermined desired operating temperature and a further value corresponding to a minimum temperature lower than said desired operating temperature; and
- fault indicating means, connected to receive control signal and also connected to said reference level producing means, for detecting a fault in response to said control signal when said heater element temperature falls below said minimum temperature and for producing an indication of said detected fault.

11. An arrangement as in claim 10 wherein said reference level producing means periodically alternates said reference level between said first and further levels only when said control signal controls said switching means to deactivate said heater element.

* * * * *